March 11, 1941.  R. C. HANFORD  2,234,249
PRODUCTION PLANNING MEANS
Filed Aug. 10, 1939  4 Sheets-Sheet 1
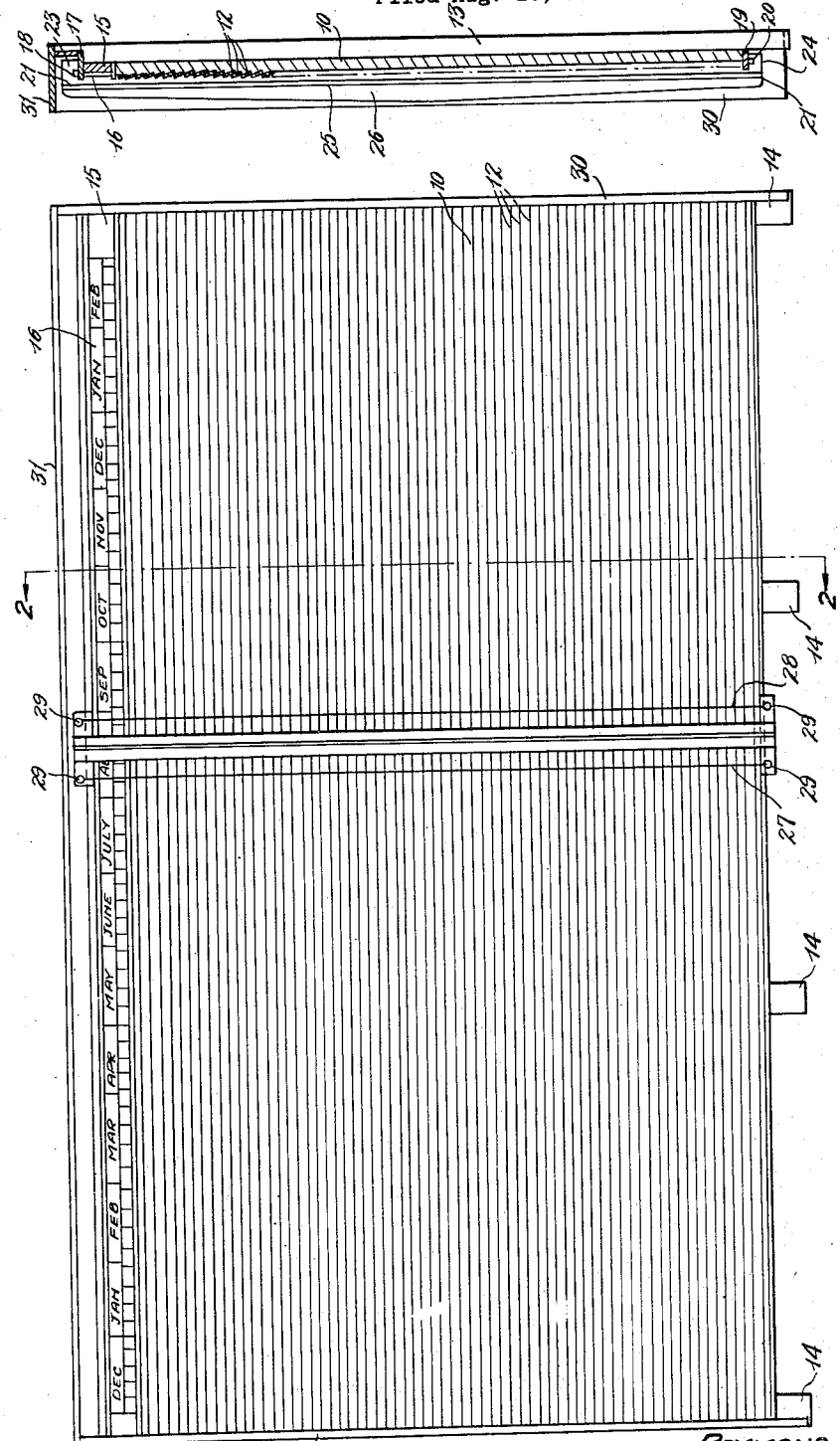
INVENTOR.
RAYMOND C. HANFORD
BY Kwis Hudson & Kent
ATTORNEYS March 11, 1941.  R. C. HANFORD  2,234,249
PRODUCTION PLANNING MEANS
Filed Aug. 10, 1939  4 Sheets-Sheet 2

INVENTOR.
RAYMOND C. HANFORD
BY
Kwis Hudson & Kent
ATTORNEYS

March 11, 1941.

R. C. HANFORD 2,234,249

PRODUCTION PLANNING MEANS

Filed Aug. 10, 1939

March 11, 1941.     R. C. HANFORD     2,234,249
PRODUCTION PLANNING MEANS
Filed Aug. 10, 1939     4 Sheets-Sheet 4
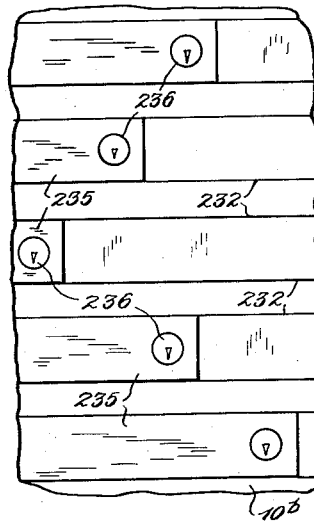
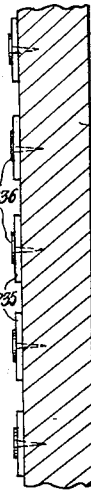
INVENTOR.
RAYMOND C. HANFORD
BY
*Kwis Hudson & Kent*
ATTORNEYS Patented Mar. 11, 1941

2,234,249

UNITED STATES PATENT OFFICE 2,234,249

PRODUCTION PLANNING MEANS

Raymond C. Hanford, Aurora, Ohio

Application August 10, 1939, Serial No. 289,459

8 Claims. (Cl. 35—24)

This invention relates to improvements in production planning means, more particularly to means for planning or scheduling the production of articles or the performance of services, and has especial reference to means for facilitating the recording, in graphic and easily understood form, reservations of production capacity against work undertaken, or vice versa, and the assignment of new work to the remaining available capacity. The invention is also adapted to facilitate the comparison of the actual progress of work with a previously established schedule.

In the production of manufactured articles the approximate amount of work required, in terms of man hours, machine hours, or other units, to produce a given quantity of finished product, is commonly known from experience or may be estimated with a reasonable degree of accuracy. The total production facilities available for all work is, of course, also known. However, with present methods of planning and controlling production it is not necessarily known nor easily determined what proportion of the total production facilities is available at any given time or for a given period of time for new work over and above the work upon which those facilities are already engaged. This is particularly true where a large variety of jobs are being performed concurrently by the same manufacturing facilities.

It is highly important for the efficient conduct of manufacturing operations that the production facilities required to perform a given quantity of work be definitely reserved for that work and that all such quantities of work, as soon as they are definitely undertaken, have the necessary facilities set aside or reserved for them. Such reservations to be informative should specify the amount of work to be done, for example the total man hours required, the period of time over which the work is to extend, and the amount of work to be performed each unit of time (for example each day) during such period. By means of reservations of this nature that portion of the production facilities already reserved for the various jobs may be determined for any desired period or for any desired point of time. The difference between this portion and the total facilities available for all work indicates what facilities are available for new work. Thus the proper starting time, the rate of working, and the probable or scheduled finishing time of the new work may be planned in advance with considerable accuracy and on the basis of factual information.

The advantages of accomplishing the above results are obvious and highly important. In the first place it is possible to reduce to the practical minimum the elapsed time required to complete a given job, thus increasing turnover and reducing in-process inventory. In the second place it is possible to supply customers and the management with shipping dates based upon facts and to adhere to those shipping dates with accuracy. Other advantages will be apparent from the description.

Accordingly it is an object of the invention to provide means for accomplishing the above desirable ends in an efficient manner and to provide means of the kind described which shall be graphic in nature so as to indicate visually certain features of the data represented.

Another object is to provide means of the character stated which shall include provision for the entry thereupon of special notations or data applicable to particular situations.

Another object is to provide means of the character stated which shall be applicable to a wide variety of work, products or circumstances and which may be employed to represent data with great accuracy and in minute detail or with less accuracy and less detail according to the requirements of the situation.

Another object is to provide means of the character stated which shall be simple and convenient in use and which may be changed readily to permit changes in the sequence, quantity, or rate of accomplishment of the work represented.

Another object is to provide means of the character stated which shall be particularly adapted for use in connection with manufacturing operations where a wide variety of products are produced concurrently by the same manufacturing facilities.

With these and other objects in view the invention consists principally in a graphic device or a chart having a time scale extending along one dimension, a series of lines, grooves, slots or the like extending parallel to the time scale and a series of elements such as strips of cardboard or the like representing certain features of work undertaken whose length and position bear a definite relation to the time scale, which strips are movable along the lines, grooves or slots of the device and are fastened thereto or held thereby in any desired position. Preferably the strips referred to are of such form as to provide visible space upon which notations or data may be written or printed. A movable guide bar or member extending transversely across the strips and the time scale is provided so that a given point of time may be indicated on all of the strips simultaneously.

Other objects and features of novelty will appear as I proceed with the description of that embodiment of the invention which, for the purposes of the present application, I have illustrated in the accompanying drawings, in which Fig. 1 is a front elevational view of one form of device for use in carrying out the invention.

Fig. 2 is a vertical sectional view taken substantially along the line 2—2 of Fig. 1.

Fig. 5 is a front elevation of a portion of the device of Fig. 1 on an enlarged scale and with a date scale and strips of card in place.

Figs. 8 and 9 are fragmental front and end elevations of another form of device in which the cards are removably fastened in place by tacks or the like.

Fig. 10a is a fragmental face view of that portion of the chart upon which the date scale is displayed, and with the latter in normal condition.

Fig. 10b is a similar view showing the date scale severed in two places and reassembled on the chart in such manner as to overlap and thereby conceal two dates previously displayed.

Fig. 10c is still another view showing a different scale substituted for the scale of Fig. 10a and with the scale lines closer together.

Fig. 11a is a view similar to Fig. 10a.

Fig. 11b is a view similar to Fig. 10b except that the divisions of the date scale instead of being overlapped are now separated so that a given period of time is shown plotted against a greater amount of work than in the case of Fig. 11a.

Fig. 11c is a similar view showing a different date scale substituted for the scale of Fig. 11a, the scale being expanded by greater separation of the gauge marks so that in this case also a given period of time is plotted against a greater amount of work than in the case of Fig. 11a.

Figure 4:
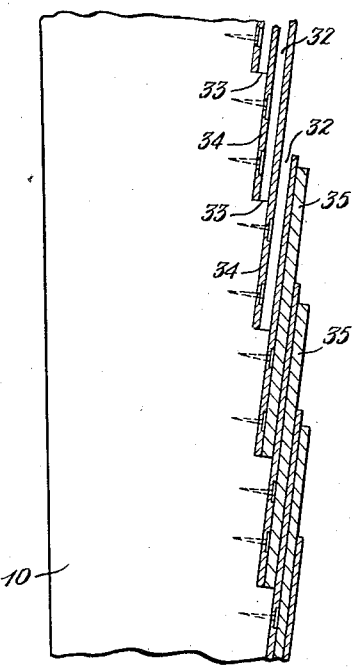
Fig. 4 is a vertical sectional view of the same.
Figure 3:
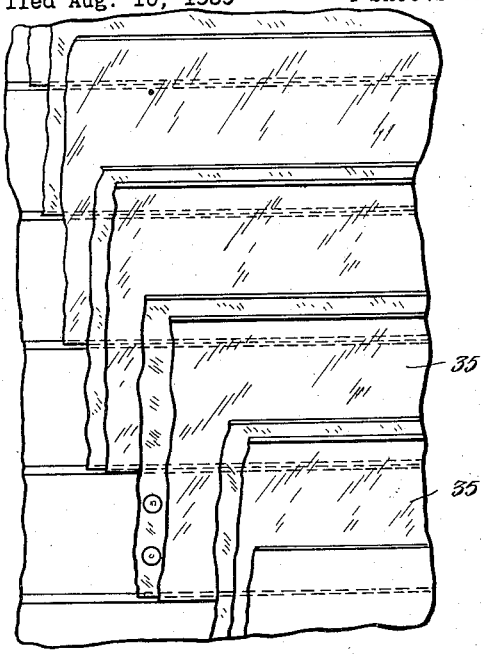
Fig. 3 is a fragmental front elevational view on an enlarged scale of the device of Fig. 1.

The form of device illustrated in Figs. 1 to 5 inclusive will now be described. 10 is a board or other support upon the forward surface of which are formed a series of grooves 12 described in detail below. This board is conveniently made of a number of pieces and accordingly cleats 13 are provided to hold the pieces together, these cleats extending below the board to form legs 14 upon which the board may rest when in a vertical position. Along the top of the board 10 is a panel 15 bearing spaced graduations constituting a time scale. Preferably but not necessarily the graduations instead of being placed directly on panel 15 are placed on a separate scale member 16 formed of cardboard or other easily removed and severable material, which is fastened to panel 15. Above the panel 15 is a supporting member 17 extending the length of the board to which is secured a tongue 18. At the bottom of the board a similar support member 19 has secured to it a tongue 20. Supported by members 17 and 19 and guided by tongues 18 and 20 is a movable cross bar 21 consisting of end pieces 23 and 24 grooved to fit tongues 18 and 20, cross piece 25, grip piece 26 and wires or strings 27 and 28 fastened by screws 29 to the grooved end pieces. The slide bar 21 is made to slide easily upon the tongues 18 and 20 while remaining parallel to itself in all positions. Known devices such as cords, not shown, attached to the slide bar and extending around pulleys, also not shown, mounted on the board at its ends are preferably provided to insure parallelism and easy operation of the bar, these parts being omitted from the drawings for the sake of clearness. At each end of the board 10 is fastened a side brace 30 and along the top a further brace 31 for rigidity and appearance.

Referring to Fig. 4, the front face of the board 10 consists of a series of parallel grooves 32 adapted to receive strips of card or the like 35. These grooves are formed by cutting angular notches 33 at regular intervals in the face of the board and attaching to the faces of these notches strips 34 of sheet metal or other suitable material. Preferably the shape of the strips and notches is such as to provide a slight spring pressure against the surface of a card placed in the groove for the purpose of preventing accidental displacement of the card.

The time scale member 16 in the illustrated form of the invention consists of a strip of material such as cardboard secured to the panel 15, upon which strip are marked months, weeks and days as shown in Fig. 5. Only working days are shown and non-working days, which in the present example consist of holidays, Saturdays and Sundays, are omitted. The graduations of the scale are spaced uniformly, for example each day may occupy one-half inch on the scale so that a given length of the scale at any point will represent a given number of working days. As mentioned above the scale is preferably removable from and replaceable upon its support and made of material which is readily severable for reasons hereinafter stated. It may however be permanently fixed to the support or be a part thereof if desired.

In the grooves 32 cards 35 are inserted to represent the work scheduled to be done. Each card indicates by its length the number of days over which a given job is scheduled to extend, and the position of the card along the time scale indicates the starting date and finishing date of that job. The card also indicates either by its physical character (as its width, color etc.) but preferably by actual figures placed on its face, the number of man hours or other units of capacity which are scheduled to be consumed for each day the job is in progress. If for example the number of man hours is to be the same for each day, that number may be represented by the width or color of the card or may be entered at some point of the card. If the number of man hours to be used varies from day to day as the job progresses, the appropriate figures are entered on the card in positions corresponding to the proper days on the time scale, so that at any time it may be possible to refer to the cards to determine how many hours have been reserved on any given day for that particular job. Cards with notations of this kind thereon are illustrated in Fig. 5 of the drawings. Other data may be entered on the card also, as for example instructions relating to the release of certain portions of the work to the shop, the actual progress of the work as compared to the schedule, etc. In Fig. 5 the points at which the erection of various machines from parts previously built is to be begun is indicated by markers 11.

Figure 6:
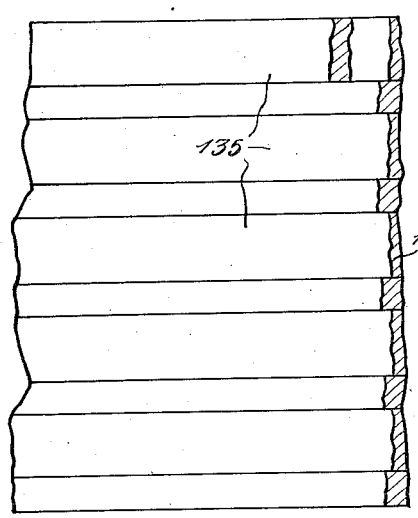
Figs. 6 and 7 are fragmental front and end elevations of an alternative form of device in which blocks serve the purpose of the cards of Fig. 3.
Figure 7:
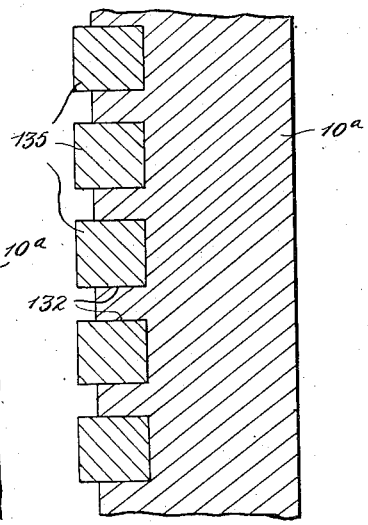

Instead of cards mounted in overlying slots I may employ the structure illustrated in Figs. 6 and 7, where the board or support 10a is provided with parallel grooves 132 for the reception of elongated blocks 135 of wood or other material. As a further modified arrangement the board or support 10b may have cards 235 attached thereto by means of thumb tacks 236 or the like, the proper alignment of the cards being facilitated by ruled lines 232 marked on the face of the board.

A relatively large number of the grooves 32 are provided in the example shown so that a large number of cards may be placed on the board to represent a variety of different jobs running concurrently. By way of example an application of the invention to the operations of a manufacturing plant producing a variety of machines will now be described. Referring to Fig. 5, the cards 35a, 35b, 35c, 35d, 35e and 35f represent the man hours required to produce the parts for machines identified by cards 36a, 36b, 36c, 36d, 36e and 36f, respectively. Thus card 35a represents the man hours required to produce the parts for lot #1 which consists of ten "D" machines, card 35b represents the man hours required to produce the parts for lot #2 which consists of five "B" machines and so on for the other cards.

Referring to card 35f for example and noting the position of its ends, it will be seen that the work is to begin on June 1st and is to be completed on July 27th. The total number of man hours required to make the parts for lot #6 is 11,296 man hours, and this number of man hours has been divided up as indicated by the card, namely 75 man hours for each of the first four days, 94 man hours for each of the next two days, 135 man hours for each of the next four days, etc. This distribution is affected by a variety of factors such as the net man hours available, that is not already reserved for other work, the extent of time over which the work is to be spread, the maximum number of hours which can be spent per day upon that particular work, and a variety of other conditions. The method of arriving at the desired distribution does not concern the present invention.

The same procedure has been followed for the other cards, each bearing information as to the number of man hours to be consumed on the corresponding work on any given day. Thus on June 1st 75 man hours are reserved for work on lot #6, 355 man hours for lot #5, 340 man hours for lot #4, 200 man hours for lot #3, and 30 man hours for lot #2. The total reservations for June 1st therefore are 1000 man hours, and assuming the capacity of the plant to be 1000 man hours per day, all of the available capacity has been reserved against work which has been undertaken and none is available on that day for any other work. To facilitate the comparison of total capacity with man hours reserved a card 37 may be placed in one of the grooves of the support or board and the total man hours which have been applied to all the lots may be entered on this card. A further card 38 may also be placed in one of the grooves and the difference between the hours applied and the capacity of the plant may be entered on this latter card, thus indicating the hours available per day which can be used for the production of new work. Thus in Fig. 5 the entire plant capacity is reserved up to and including June 16th. Beginning with June 17th there are an increasing number of man hours available for new work.

It is apparent that the details of the use of the invention may be varied to a considerable degree. Thus the work of each department of a manufacturing plant may be scheduled separately upon the same board or all departments may be lumped together and one schedule made to serve for all. The work being scheduled may also be broken down into any desired number or kinds of units, thus individual units of the product or groups of units may be plotted separately or in combination. As an example, the production of parts for all of the machines to be produced may be plotted by lots on one portion of the board and the erection of machines from the individual parts may be plotted by individual machines against the available capacity of the erecting department on another portion of the board.

An important feature of the invention is the arrangement by which changes in the schedule may be made to correspond with fluctuations in the total producing capacity of the plant, or to compensate for differences between work as actually accomplished and as previously scheduled. For example it might become necessary for the management to reduce the producing capacity of the plant by ten percent. Obviously the work already scheduled would require one-tenth longer time to complete. To take care of this change new cards might be made for all such work, which cards would be one-tenth longer and show one-tenth less man hours per day. Such procedure would entail considerable effort and time, which may be avoided by the simple expedient of removing the date strip 16 and either cutting out or sliding under every tenth working day, so that every tenth day disappears from the date scale. In this way the dates for completing the various jobs are automatically extended by the proper amount. It is true that the total of work scheduled for any one day would still be equal to the capacity before the one-tenth reduction, but on every tenth actual working day the factory would be working and no work would be showing for that day on the chart. In this way the factory would catch up with the amount it had fallen behind in the previous nine days.

Similarly, if the capacity were increased by one-tenth the date scale could be severed at every tenth day and separated at that point by the distance corresponding to one day, so that the original schedule covering a ten day period would, on the new scale, be completed in nine working days. Thus the factory would get ahead of schedule ten percent each day, but on the 10th day would drop back into agreement with the chart.

Another method of taking care of alterations in the producing capacity of a plant without changing the schedule cards 35 consists in replotting the date scale upon different units than before. Thus, if the producing capacity is reduced by ten percent and the original date scale was plotted with one-half inch equal to one day, a new date scale could be plotted in which forty-five one-hundredths of an inch equals one day.

Figs. 10a, 10b and 10c illustrate an example of changing the date scale where the maximum producing capacity has been changed from 1000 man hours per day to 900 man hours per day effective June 1st. Since in this case 9000 man hours of work which previously would have consumed nine days, will now require ten days to complete, the ten days must appear on the date scale within the same space previously occupied by nine days on the scale. As shown in Fig. 10b this may be accomplished by severing the date scale between June 13th and June 14th and underlapping the pieces so that June 14th lies behind June 15th. Thus for each of the days from June 1st to June 13th more work is scheduled than can be produced for each given day, but no work is shown as scheduled for June 14th and upon that day the production facilities will make up the amount which they lagged behind during the previous nine days. In Fig. 10c the same result is accomplished by plotting the date scale so that the graduations are closer together, in other words the space previously occupied by nine days has been divided into ten parts and all of the dates appear on the scale. In this case, as in the previous case, the amount of work represented by a given card 35 will not represent the true amount of work to be accomplished each day, but at the end of every ten day period the graduations on the date scale will coincide with the units employed on the card and the two will be in balance.

Figs. 11a, 11b and 11c illustrate the case in which the maximum producing facilities have been increased from 1000 man hours to 1100 man hours per day. In this case work formerly requiring eleven days can be done in ten days, and therefore at the end of every tenth day on the date scale the latter may be severed and the parts spread apart by the space equivalent to one day and the parts again fastened in place, as illustrated in Fig. 11b. But, as indicated by the cord 27 at the end of June 14th work originally planned to be completed at the end of June 15th has been finished and in the meantime the date scale and work cards have not been in balance since the producing facilities have gradually gotten ahead of the schedule. At the end of the ten day period however they are again in balance. Fig. 11c illustrates the date scale with ten graduations in the space previously occupied by eleven days for accomplishing the same purpose.

It is apparent from the preceding discussion that in the employment of this invention it is desirable to arrange the date scale and the cards identifying the various jobs upon the basis of the normal producing capacity, and to alter the date scale only to take care of temporarily abnormal conditions.

Although the invention has been described as applied to the production of articles or parts of various machines, it is to be understood that it could also be applied to the scheduling of services or other types of work. Also, although in the example cited the unit of work referred to is man hour, other units, such as machine hours, department days, etc., may be readily employed without changing the fundamental aspects of the invention.

Having thus described my invention, I claim:

1. A device for use in scheduling the rate and time of performance of the work of a plurality of jobs, comprising a member bearing spaced graduations constituting a time scale adapted to indicate work periods arranged in chronological order, a series of individual elements each bearing indicia adapted to designate selected amounts of work to be performed during different work periods, each element being of a length corresponding to a selected number of graduations of said scale, and each element being selectively located relative to said graduations in a position corresponding to the particular periods during which the amount of work so designated is scheduled to be performed, and supporting means for said elements adapted to removably support the elements in selected relation to said graduations, whereby the work scheduled on the various elements opposite a given graduation on the time scale may be caused to total the available capacity for the time represented by said graduation.

2. A device for use in scheduling the rate and time of performance of the work of a plurality of jobs, comprising a member bearing spaced graduations constituting a time scale adapted to indicate work periods arranged in chronological order, a series of individual elements each bearing indicia adapted to designate selected amounts of work to be performed during different work periods, each element being of a length corresponding to a selected number of graduations of said scale, and each element being selectively located relative to said graduations in a position corresponding to the particular periods during which the amount of work so designated is scheduled to be performed, and supporting means for said elements adapted to removably support the elements in selected relation to said graduations, said supporting means being adapted to frictionally hold said individual elements in any desired position within the limits of said time scale, whereby the work scheduled on the various elements opposite a given graduation on the time scale may be caused to total the available capacity for the time represented by said graduation.

3. A device as claimed in claim 1 comprising a sight member associated with said graduations and said elements, said sight member being movable to any selected position along said time scale and being adapted to indicate for a selected position a given work period and those portions of each of said elements corresponding to that period.

4. A chart for use in scheduling the rate and time of performance of the work of a plurality of jobs, comprising a series of longitudinal columns each bearing indicia adapted to indicate work to be done in a plurality of work periods as parts of a larger job of work, said longitudinal columns being individually movable lengthwise, movable means for delineating into transverse columns the items in said longitudinal columns which fall in the same work period, the transverse columns extending across the longitudinal columns to form areas each of which is thereby identified exclusively with a particular longitudinal column and a particular transverse column, and a longitudinal column bearing suitable indicia adapted to indicate the sums of the amounts of work in the transverse columns.

5. A device for use in scheduling the rate and time of performance of the work of a plurality of jobs, comprising a longitudinally extending member bearing spaced graduations constituting a time scale adapted to indicate work periods arranged in chronological order, a series of individual longitudinally extending elements disposed parallel to said time scale member, each element being adapted to indicate by its character an amount of work to be performed and being selectively located relative to said graduations in a position corresponding to the particular work periods during which the amount of work so indicated is to be performed, said elements comprising relatively thin cards or the like having selected lengths equal to a plurality of said graduations and having normally exposed surfaces suitable for receiving written matter, and supporting means for said elements adapted to removably support the latter in selected relation to said graduations, said supporting means comprising a relatively thick backing portion and a series of relatively thin strips attached thereto in overlapping relation with each other and at a slight angle to the general plane of said forward face, providing a series of continuous slots extending parallel to said time scale member for receiving said cards.

6. A device for use in scheduling the rate and time of performance of the work of a plurality of jobs, comprising a support, a member removably and replaceably attached to said support bearing spaced graduations constituting a time scale adapted to indicate work periods arranged in chronological order, said scale member being of relatively easily severable material, whereby the scale member may be removed and severed into separate parts at any desired point and the separate parts attached to said support in new positions, and a series of elements removably mounted upon said support, each element having divisions corresponding to said scale graduations and having in said divisions indicia adapted to designate selected amounts of work to be performed, and each element being selectively located relative to said graduations in a position corresponding to the particular periods during which the amount of work so designated is scheduled to be performed.

7. A device for use in scheduling the rate and time of performance of the work of a plurality of jobs, comprising a support, a member removably and replaceably attached to said support divided into parts, each part bearing evenly spaced notations constituting a time scale adapted to indicate work periods arranged in chronological order, said parts of said scale member being displaced relative to each other lengthwise of the scale by a distance equal to a whole number of notations, and a series of elements removably mounted upon said support, each element having divisions corresponding to said scale notations and bearing indicia adapted to designate amounts of work to be performed, and being selectively located relatively to said notations in positions corresponding to the particular periods during which the amount of work so designated is scheduled to be performed.

8. A device for use in scheduling the rate and time of performance of the work of a plurality of jobs, comprising a member bearing spaced graduations constituting a time scale adapted to indicate work periods arranged in chronological order, a series of individual elements each embodying a characteristic adapted to designate selected amounts of work to be performed during different work periods, each element being of a length corresponding to a selected number of graduations of said scale, and each element being selectively located relative to said graduations in a position corresponding to the particular periods during which the amount of work so designated is scheduled to be performed, and supporting means for said elements adapted to removably support the elements in selected relation to said graduations, whereby the work scheduled on the various elements opposite a given graduation on the time scale may be caused to total the available capacity for the time represented by said graduation.

RAYMOND C. HANFORD.